Sept. 26, 1967     A. L. MORASKI     3,343,807
SHOVEL
Filed May 7, 1965
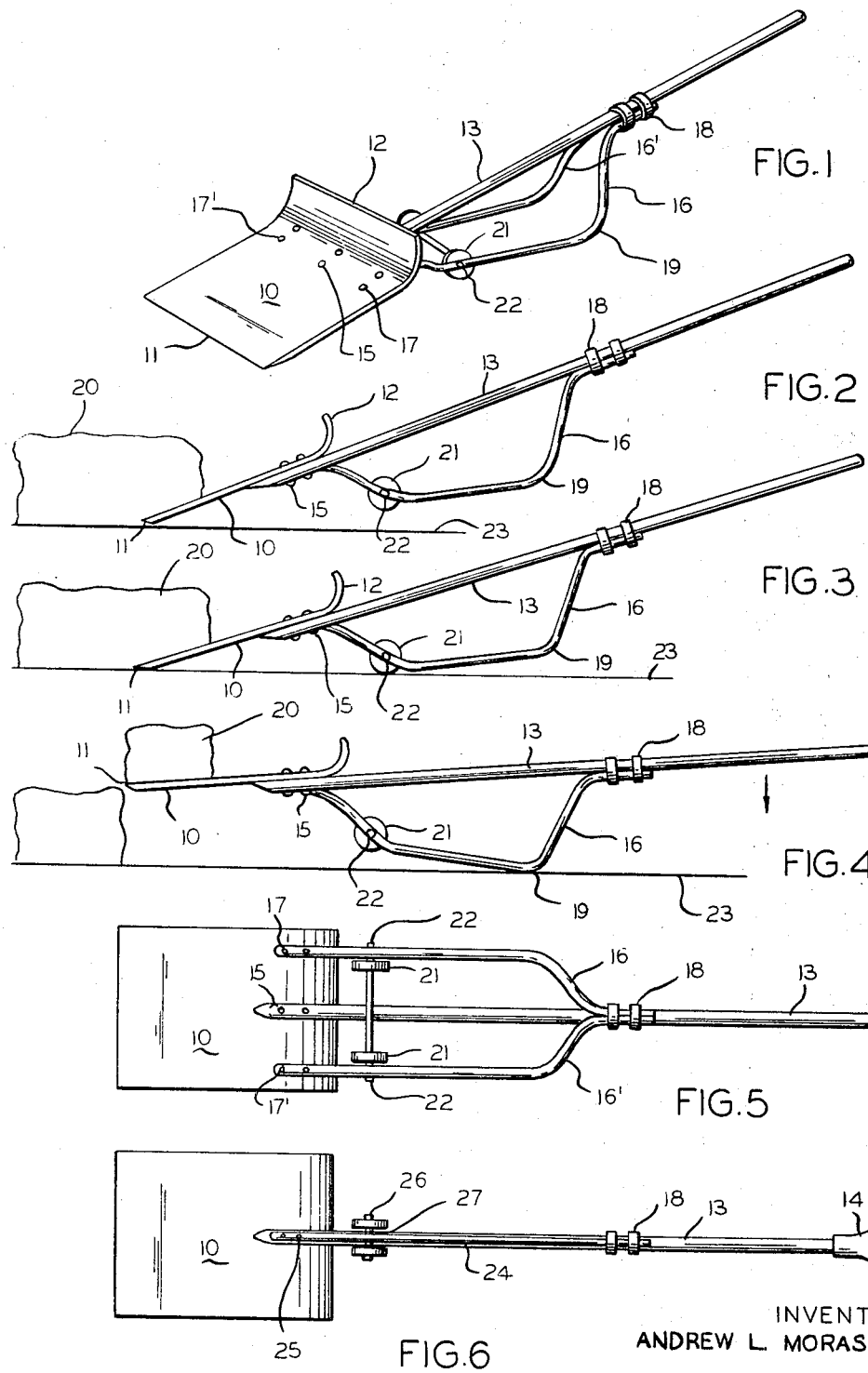
INVENTOR
ANDREW L. MORASKI
BY *Mullin and Alter*
ATTORNEYS

United States Patent Office 3,343,807
Patented Sept. 26, 1967

3,343,807
SHOVEL
Andrew L. Moraski, 1901 S. 6th St.,
Milwaukee, Wis. 53204
Filed May 7, 1965, Ser. No. 454,094
3 Claims. (Cl. 254—131.5)

ABSTRACT OF THE DISCLOSURE

Includes shovel blade associated with a handle. The handle has a pair of rod members extending downwardly therefrom in opposite directions from opposite sides of said handle with the lower end of said rods being associated with said shovel blade. The rods form a pivot point when contacting a surface so that when a downward force is applied to the handle the pivot point contacts the surface and causes the shovel blade to be raised.

My invention relates to improvements in shovels, and more particularly to shovels for removing snow or the like from any surface or pavement.

The object of my invention is to construct a device that provides leverage for raising snow or the like from the surface being serviced.

Another object of my invention is to provide a device of the character described that is equipped with rotatably mounted wheels to enable it to be balanced and retained in a level position while the shovel blade is contacting the surface of the pavement or the like.

A still further object of my invention is to construct a device that may be manipulated in the usual manner without special mechanical skill.

A snow shovel constructed in accordance with the present invention comprises shovel blades including a forward edge for moving in contact with the surface from which snow is to be removed. The shovel further includes a handle having a forward end attached to the blade and gripping it. At least one rod member having a front and rear portion is provided with the front portion extending downward from the handle above the forward end and the rear portion connected to the free end of the front portion and extending upward therefrom with the free end of the rear portion being attached to the blade so that the junction of the front and rear portions may act as a pivot point when contacting the surface and its downward force is applied to the gripping end of the handle to lift the blade out from the surface.

Another important aspect of the invention is the provision of roller wheels provided on the rod member so that the shovel when positioned with the forward blade on the surface from what is snow is to be removed rests upon the rollers so it may be rolled or propelled forward into the snow.

The device described, illustrated and claimed herein, enables the operator to easily move the shovel horizontally on the surface being cleaned due to the rollers maintaining the shovel in a level position. After the surface of the shovel is loaded, the handle may be forced downward, creating a leverage supported by the fulcrum at a point rearward from the shovel blade.

Other and further objects of my invention will become more apparent as the description proceeds, when taken in conjunction with the drawings, in which:

FIG. 1 is a perspective view of an embodiment embodying the principles of my invention.

FIG. 2 is a side view of the assembled device with only the forward edge of the shovel blade contacting the surface being serviced.

FIG. 3 is a similar side view showing the rollers in contact with the surface while the shovel blade contacts the snow.

FIG. 4 is a similar side view showing the loaded shovel blade being raised and pivoted on the fulcrum.

FIG. 5 is a bottom view of the assembled device showing two rollers and the fulcrum consisting of a pair of rods; and FIG. 6 is a modified form of the device equipped with a single pivot rod and a pair of rotatably mounted wheels.

Similar characters of reference indicate corresponding parts throughout the several views, and referring now to the same, the character 10 shows a conventional shovel blade usually provided with a sharp forward edge 11 with a radially upward disposed back edge 12.

There is a handle 13 which may be constructed of wood, a metal tube, or the like, and may be equipped with a conventional grip shown as 14 in FIG. 6. The handle 13 is shown attached at its forward end to the blade 10 at point 15 by means of rivets or bolts, or in any other practical manner.

By referring to FIGS. 1 through 5, it will be noted that I show a pair of rods 16 and 16' (see FIG. 5), which are attached to the shovel at points 17 and 17' respectively, on opposite sides of point 15 where the handle is mounted. Obviously, the attachment of the rods 16 and 16' to the blade 10 may be in any convenient and effective manner, such as rivets which are shown.

Rods 16 and 16' each have a front portion attached to handle 13 by means of straps 18 encircling the handle 13. The front portions of rods 16 and 16' extend downward from opposite sides of the handle. A rear portion of rods 16 and 16' extend upward from the free ends of the front portions to connect to the shovel blade 10 at points 17 and 17'. The junction of the front portions and rear portions form a fulcrum point 19 which acts as a pivot when the handle 13 is forced downward, thereby raising the shovel blade 10 from the surface as shown FIG. 4, and lifting the snow, or the like, shown in phantom as 20.

The rods 16 and 16' are also equipped with rollers 21 which are pivoted at points 22 in any convenient and practical manner. Rollers 21 are positioned near the blade 10 between the ends of the rod rear portions. The rollers 21 contact the pavement or surface 23 (see FIG. 3) to enable the blade 10 to be forced beneath the snow 20, before the fulcrum action is employed. When the rollers 21 are being employed, the fulcrum is not in contact with the surface.

In FIG. 6 I show a bottom view of the assembly constituting my invention, in which I employ a single rod or strip 24 attached at 25 to the mounting of the handle 13 to the blade. The rod 24 is supported at its rearward end to the handle 13 by straps 18. This single rod 24 is shown equipped with a pair of rollers 26, rotatably mounted onto a pin 27 for their support.

From the above description it will become manifest that the device constituting my invention is simple in construction, may be constructed light in weight, and is highly efficient for the purpose for which it is intended.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

Having thus described my invention, what I claim and desire to secure by Letters Patent of the United States is:

1. A shovel for removing snow and the like comprising: a shovel blade including a forward edge, said forward edge moving in contact with a surface and causing snow to be loaded on said blade;

a handle having a forward end and a gripping end, said forward end being attached to said shovel blade; and a pair of rod members each having a front portion extending downwardly and outwardly from opposite sides of said handle above said forward end and a rear portion having one end thereof connected to the free ends of said front portion and inclining upward therefrom, the other ends of each of said rear portions being attached to said shovel blade on the opposite sides of said forward end of said handle, the junction of said front and rear portions acting as a pivot point when contacting said surface and a downward force is applied to the gripping end of said handle to lift said shovel blade away from said surface.

2. A shovel as defined in claim 1, wherein said angled rod members are connected at a common point above the forward end of said handle.

3. A shovel as defined in claim 1, wherein a pair of rollers is rotatably mounted to a shaft, said shaft being connected between said ends of each said rear portion of said rods.

References Cited

UNITED STATES PATENTS 130,231  8/1872  Meigs et al. _____ 254—131.5

FOREIGN PATENTS 76,496  10/1961  France.
        (1st addition to No. 1,215,811)
71,422  8/1945  Norway.

OTHELL M. SIMPSON, *Primary Examiner.*